(12) United States Patent
Handal et al.

(10) Patent No.: US 9,230,126 B2
(45) Date of Patent: Jan. 5, 2016

(54) DEVICE AUTHENTICATION FOR SECURE KEY RETRIEVAL FOR STREAMING MEDIA PLAYERS

(75) Inventors: Thomas Handal, San Diego, CA (US); Matthew E. Messerman, San Diego, CA (US); Akinwale Olugbile, San Diego, CA (US); Petr Peterka, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 0 days.

(21) Appl. No.: 13/695,497

(22) PCT Filed: May 4, 2011

(86) PCT No.: PCT/US2011/035277
§ 371 (c)(1),
(2), (4) Date: Mar. 18, 2013

(87) PCT Pub. No.: WO2011/140288
PCT Pub. Date: Nov. 10, 2011

(65) Prior Publication Data
US 2013/0174271 A1 Jul. 4, 2013

Related U.S. Application Data

(60) Provisional application No. 61/331,182, filed on May 4, 2010.

(51) Int. Cl.
*G06F 21/62* (2013.01)
*G06F 17/30* (2006.01)
(Continued)

(52) U.S. Cl.
CPC .......... *G06F 21/62* (2013.01); *G06F 17/30017* (2013.01); *G06F 21/10* (2013.01);
(Continued)

(58) Field of Classification Search
None
See application file for complete search history.

(56) References Cited

U.S. PATENT DOCUMENTS

| 7,650,361 B1 | 1/2010 | Wong et al. |
| 2003/0167392 A1 | 9/2003 | Fransdonk |

(Continued)

FOREIGN PATENT DOCUMENTS

| CN | 101310263 A | 11/2008 |
| WO | 2011140288 A1 | 11/2011 |

OTHER PUBLICATIONS

International Search Report and Written Opinion for International Application No. PCT/US11/35277, International Filing Date May 4, 2011, Search Completed Jul. 18, 2011, Mailed Aug. 2, 2011, 7 pgs.
Extended European Search Report for European Application EP11778315.9, Report Completed Mar. 5, 2015, Mailed Mar. 12, 2015, 5 Pgs.

*Primary Examiner* — Lisa Lewis
*Assistant Examiner* — Henry Tsang
(74) *Attorney, Agent, or Firm* — KPPB LLP

(57) ABSTRACT

Systems and methods are disclosed that authenticate devices or users, and enable playback of secured streaming content through a media player. In one embodiment, the invention is a system for receiving secure content over an unmanaged network, including a security application configured operate on a user device with access to a network, where the security application is configured to receive a request for playlist data from the media player, send a playlist request to a content server, receive playlist data from the content server, send playlist data to a media player, receive a security access request from the media player, send a security access request to a security server, receive security access data from the security server; and send security access data to a media player.

25 Claims, 7 Drawing Sheets

(51) Int. Cl.

| | |
|---|---|
| *G06F 21/10* | (2013.01) |
| *H04L 29/06* | (2006.01) |
| *H04N 21/266* | (2011.01) |
| *H04N 21/4627* | (2011.01) |
| *H04N 21/475* | (2011.01) |
| *H04N 21/835* | (2011.01) |
| *H04N 21/254* | (2011.01) |
| *H04N 21/258* | (2011.01) |
| *H04N 21/262* | (2011.01) |
| *H04N 21/482* | (2011.01) |

(52) U.S. Cl.
CPC ........ *H04L63/0823* (2013.01); *H04L 65/4084* (2013.01); *H04N 21/2541* (2013.01); *H04N 21/25816* (2013.01); *H04N 21/25875* (2013.01); *H04N 21/26258* (2013.01); *H04N 21/26613* (2013.01); *H04N 21/4627* (2013.01); *H04N 21/4753* (2013.01); *H04N 21/4825* (2013.01); *H04N 21/835* (2013.01); *H04L 63/104* (2013.01); *H04L 2463/101* (2013.01)

(56) References Cited

U.S. PATENT DOCUMENTS

| | | | |
|---|---|---|---|
| 2004/0015703 | A1 | 1/2004 | Madison et al. |
| 2005/0131832 | A1 | 6/2005 | Fransdonk |
| 2005/0188051 | A1* | 8/2005 | Sneh ............................. 709/213 |
| 2006/0075440 | A1* | 4/2006 | Rijckaert ........................ 725/88 |
| 2006/0193474 | A1* | 8/2006 | Fransdonk .................... 380/279 |
| 2007/0226775 | A1 | 9/2007 | Andreasen et al. |
| 2008/0184359 | A1* | 7/2008 | Khedouri et al. .............. 726/12 |
| 2008/0201748 | A1* | 8/2008 | Hasek et al. ................... 725/98 |
| 2008/0212774 | A1* | 9/2008 | Moors et al. .................. 380/201 |
| 2008/0255878 | A1 | 10/2008 | Wise |
| 2008/0295174 | A1* | 11/2008 | Fahmy et al. ................... 726/23 |
| 2009/0043906 | A1* | 2/2009 | Hurst et al. ................... 709/231 |
| 2009/0106442 | A1* | 4/2009 | Liu ............................... 709/231 |
| 2009/0183081 | A1* | 7/2009 | Rodriguez et al. ............ 715/733 |
| 2009/0235347 | A1 | 9/2009 | Syed et al. |
| 2010/0186065 | A1* | 7/2010 | Chung et al. .................... 726/1 |
| 2011/0119394 | A1* | 5/2011 | Wang et al. ................... 709/231 |

* cited by examiner

DEVICE AUTHENTICATION FOR SECURE KEY RETRIEVAL FOR STREAMING MEDIA PLAYERS

FIELD OF THE INVENTION

The present invention relates generally to streaming media players and specifically to authentication and content security in streaming media players.

BACKGROUND OF THE INVENTION

Traditionally, content has been distributed on managed networks where the bandwidth is guaranteed and robust. Managed networks are networks under management by at least one operator, often a user or processor that can determine if a request for content should be granted. Managed networks can define access and use of the network, such as setting bandwidth usage for certain authorized users. Managed networks give operators a stable platform to manage their network of content distribution across devices, such as televisions and computers. Recently, there has been a significant increase in the number of mobile devices that are able to provide video playback, such as laptops, mobile phones, smart phones, net books and tablets. Content is typically provided to such mobile devices on unmanaged networks whose bandwidth can fluctuate and be sporadic. Unmanaged networks are networks not under direct management by an operator, such as a 3G network, broadband Internet networks or WiFi hot spots where any user can access the network. These unmanaged networks allow users greater access to content over a network from virtually any location. As the networks are unmanaged, the distribution of content over these networks presents unique challenges in security and access to content.

Distribution of video content on unmanaged networks, known as "Over-the-Top" (OTT) distribution, has become popular. Many solutions have been introduced for distributing this content over these unmanaged networks. For example, several. protocols allow for adaptive bitrate streaming that adjusts the video bitrate to available resources such as bandwidth and processing power, enabling an immediate yet uninterrupted viewing experience. One such protocol is specified by Apple in the HTTP Live Streaming (HLS) protocol. This protocol, which Apple has integrated into its QuickTime player, uses the concept of slicing the video into chunks in order to deliver the content to the device while retaining the ability to switch to alternate bitrate versions of the content. This allows the ability to adapt to fluctuating bandwidth, which can be problematic on an unmanaged network. The HLS protocol takes into account encryption of the chunks. The chunks can be encrypted using AES-CBC-128. The key is served from the HTTP server and can be retrieved over HTTPS.

However, security for OTT content often lacks certain features that are typically found in Conditional. Access (CA) or Digital. Rights Management (DRM) systems, such as user/device authentication, device provisioning, output control signaling and content rating/parental control. In two way content protection systems, the client can provide information back to the head-end that can aid in clone detection or identification of other attacks. Yet, in devices with limited hardware (HW) security, attacks such as jail-breaking or rooting may jeopardize the overall security of the device and the content streamed to it. Jail-breaking or rooting are processes that allow devices running a certain operating system to gain full access to previously "locked" features of an operating system, removing the limitations imposed by the device manufacturers, the network operator, or the developer.

Therefore, the flexibility of unmanaged networks presents its own set of issues. The ability for mobile devices to access content over a network from virtually any location greatly increases the number devices that will request such content, many of which requests may be from unauthorized users or devices. Unmanaged networks also make it more difficult to develop data on users or devices, as well as presenting challenges in authenticating and tracking users and devices accessing content from different access points.

SUMMARY OF THE INVENTION

In one embodiment, the invention is a system for receiving secure content over an unmanaged network, including a security application configured operate on a user device with access to a network, where the security application is configured to receive a request for playlist data from the media player, send a playlist request to a content server, receive playlist data from the content server, send playlist data to a media player, receive a security access request from the media player, send a security access request to a security server, receive security access data from the security server; and send security access data to a media player. In another embodiment, the security application is also configured to send registration information to a registration server, and receive a signed security certificate from the registration server. In a further embodiment, the registration information includes a unique user identifier. In a still further embodiment, the unique user identifier is received on the user device.

In another embodiment, the media player is configured to send a content request to a content server using the playlist data and to receive content from the content server for playback on the media player.

In one embodiment, the security application is embedded in the media player. In another embodiment, the media player and the security application communicate securely with each other. In yet another embodiment, the security application is further configured to obtain device data from the user device associated with the security application, send at least a portion of the device data to the security server, and receive security access data associated with the device data from the security server, wherein the security access data allows access to secured content based on the device data. In a still further embodiment, the device data includes the age of a user of the security application. In another embodiment, the device data includes the geographic location of the user device. In one embodiment, the device data includes a predetermined function of the user device. In another embodiment, the device data comprises a determination of the security status of the device. In a yet further embodiment, the device data includes a determination of the device's output capabilities.

In another embodiment, the content request includes a request for an advertisement, and the content comprises the advertisement for playback on the media player.

In yet another embodiment, the security application is also configured to obtain device data from a user device associated with the security application, send at least a portion of the device data to the security server, receive playlist data including targeted advertisements based upon the device data, and send the playlist data to the media player.

In another embodiment, the security application is configured to parse the playlist data and replace all Uniform Resource Identifiers in the playlist data related to the playlist request and the security access request with modified Uniform Resource Identifiers directing the playlist request and the security access request from the media player to the security application. In a further embodiment, the security application is configured to determine a security status of the device and send playlist data to the media player in accordance with the security status of the device. In a still further embodiment, the playlist data includes content accessible by different bitrate streams that are encrypted by different keys. In yet another embodiment, the playlist data includes different authorizations, with associated cost levels, that require different keys from the security server for the different authorizations. In yet another embodiment, the security access data comprises multiple keys for decrypting different parts of content sent from the security server to the security application simultaneously.

In another embodiment, the security application obtains a key in the security access data before such key is requested in a content access request and caches the key until the key is requested in a content access request.

In another embodiment, the security access data includes a key and at least one output control.

The invention is also embodied by a method of receiving secure content over a network using a security application configured to operate on a user device with access to a network, including the steps of receiving a request for playlist data from the media player, sending a playlist request to a content server, receiving playlist data from the content server, sending playlist data to a media player, receiving a security access request from the media player, sending a security access request to a security server, receiving security access data from the security server, and sending security access data to a media player. Another embodiment includes the steps of sending registration information to a registration server, and receiving a signed security certificate from the registration server.

In a still further embodiment, there is a system for receiving secure content over an unmanaged network, including a security application configured to operate on a user device with access to the network, where the security application is configured to send registration information to a registration server, where the registration information comprises a unique user identifier received on the user device, and to receive a signed security certificate from the registration server, to receive a request for playlist data from the media player, to send a playlist request to a content server, to receive playlist data from the content server, to send playlist data to a media player, to receive a security access request from the media player, to send a security access request to a security server, where the security access request comprises a request for a key required to decrypt encrypted content, to receive security access data from the security server, and to send security access data to a media player.

DETAILED DISCLOSURE OF THE INVENTION

Turning now to the drawings, systems and methods for authenticating devices or users, and enabling playback of secured streaming content through a media player are illustrated.

Many embodiments include streaming content to a media player where a security solution enables a device to access secured streaming content. A user device is configured to playback content using a media player. The user device also includes a security application that manages access to streaming content for the media player. The security application manages user and device registration with a security server. Playlist data containing information about content and security data are received by the security application from a content server and sent to a media player. Content is selected and streamed directly to a media player.

The security application handles security issues of the system, including requesting and receiving security certificates, tokens and keys for playing encrypted or secured content. Secured content is any content with security features, including encryption or access conditioned upon a login token.

The security application also authenticates and manages access to security. For example, the security application fillers playlist data for appropriate media player content and procures initial security keys in content, such as a video, ahead of or upon streaming initialization. Thereby, media players on user devices can securely access content over an unmanaged network, using the security application to authenticate the device and negotiate security.

System Diagram

Figure 1:
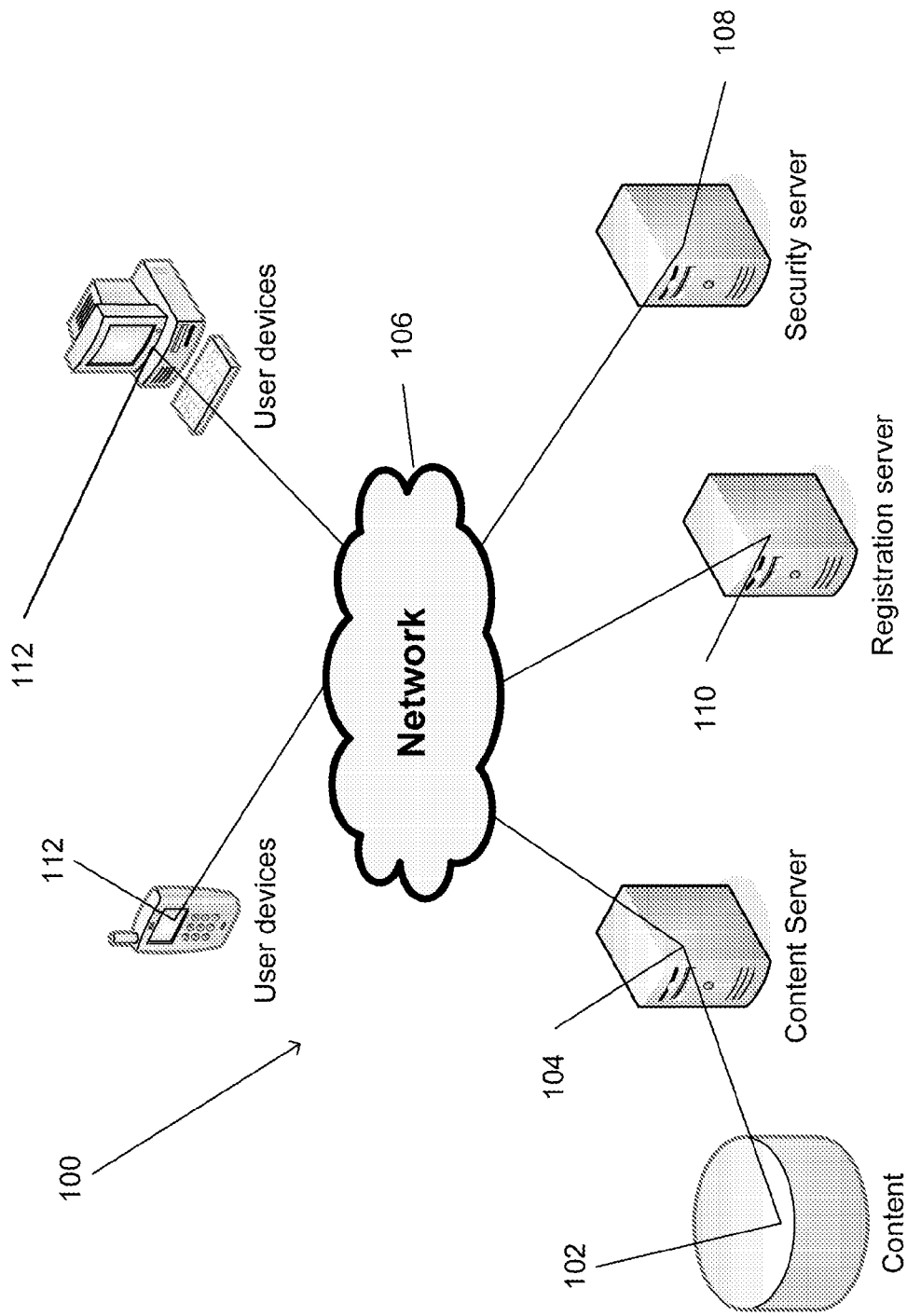
FIG. 1 is a semi-schematic diagram of a system with a security solution configured to stream content to user devices in accordance with an embodiment of the invention.

FIG. 1 is a semi-schematic diagram of a system with a security solution configured to stream content to user devices in accordance with an embodiment of the invention. The system 100 includes a storage device for content 102 connected to a content server 104. The content server is connected to a network 106, such as the Internet. The system 100 also includes a security server 108 and a registration server 110 connected to the network. User devices 112 can access the content through the content server 104, registration server 110 and security server 108, via the network 106.

In many embodiments, content such as video media is accessed by user devices. Media is content in the format required for the consumption of content. The user devices access a content server for access to the content. The user devices are authenticated by an operator or middleware on a registration server. The user devices register with a registration server in order to provision the device, then access a security server to obtain security access data to allow decryption of the content. For example, in one embodiment, the registration server validates a user and provisions the device. In one embodiment, the registration server sends a signed security certificate to the security application. A signed security certificate is data that authorizes a user or devices to access content. The device, through the security application, then contacts the security server, which transmits security access data for authenticated user devices or users for content access. In one embodiment, the security access data comprises keys to access encrypted content. A key is data that allows a user to decrypt encrypted content for playback. In other embodiments, the security access data received from the security server includes other security access features such as login tokens for access or usage rules to protected content. The network in certain embodiments can be an unmanaged network where users can access content.

In the illustrated embodiment, user devices 112 access the content server 104, registration server 110 and the security server 108 over a network 106. A user and device is first authenticated by the registration server 110. For example, the operator on the registration server determines if the user and user device has paid the current subscription fees to access content. The registration server then sends a signed certificate to the security application upon successful registration. Content is sent to user devices 112 from a content server 104 and over a network. Security access data, such keys or tokens are sent to registered user devices from the security server 108 over the network 106. The security server 108 sends content to the security application upon receiving the appropriate signed certificate indicated a registered security application. For example, multiple keys may be required in streaming content, such as a movie, for playback. Therefore, the user devices 112 must have access to the keys in order to decrypt the streaming content for playback. In many embodiments, the registration server and security server may be co-hosted in the same location or even the same server.

Streaming Content with Security Solution on a User Device

Figure 2:
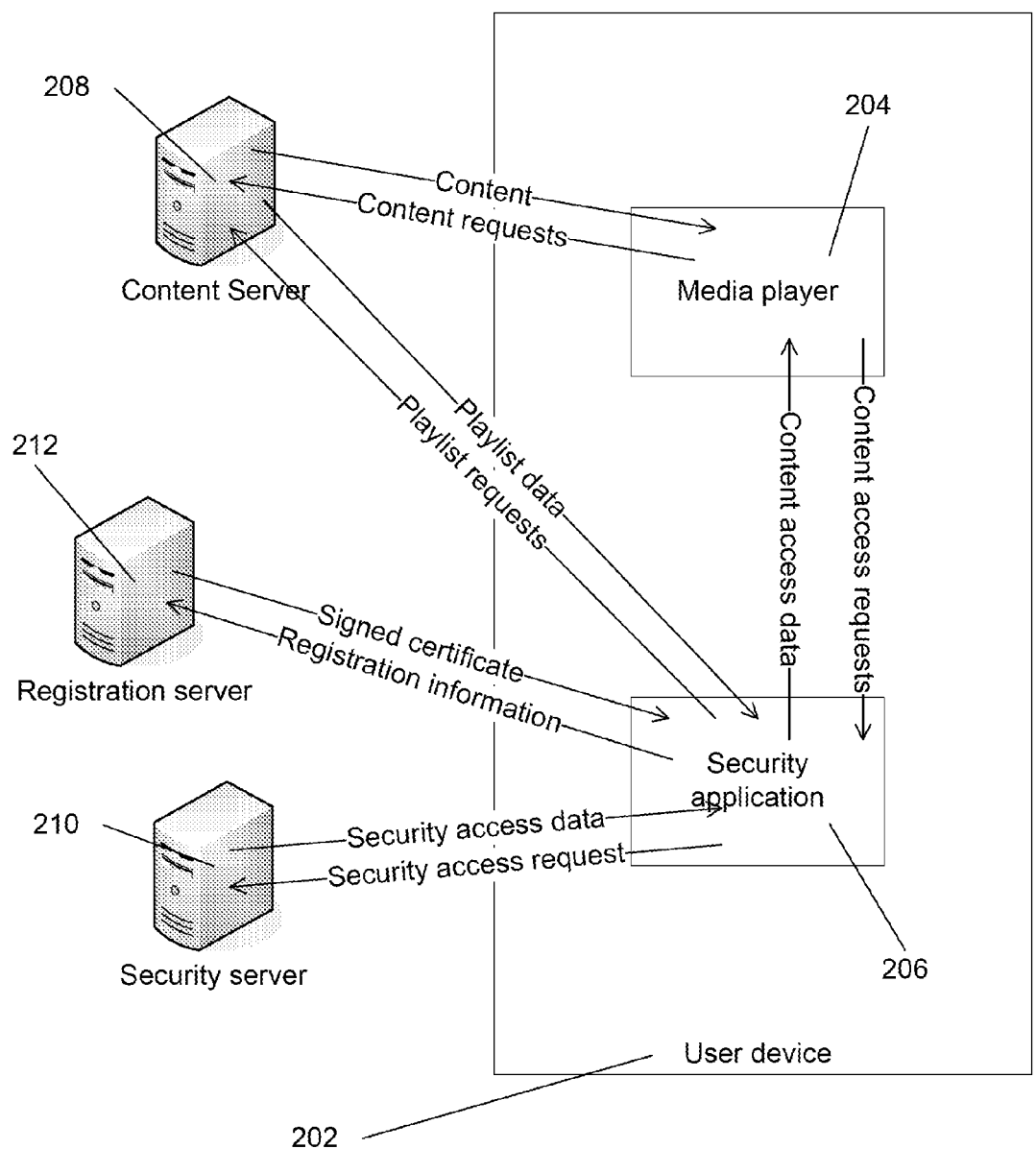
FIG. 2 is a high level diagram of streaming content with a security solution on a user device in accordance with an embodiment of the invention.

FIG. 2 is a high level diagram of streaming content with a security solution on a user device in accordance with an embodiment of the invention. A user device 202 includes a media player 204 and a security application 206. The security application 206 is configured to send content access data (such as decryption keys) to the media player 204 and the media player 204 is configured to send content access requests to the security application 206. A content server 208 is configured to send content to the media player 204 and the media player 204 is configured to send a content request to the content server 208. The content server 208 is configured to send playlist data to the security application 206 and the security application 206 is configured to send a playlist request to the content server 208. The security application 206 is configured to send a security access request to a security server 210 and the security server 210 is configured to send security access to the security application 206. The security application 206 is configured to send registration information to a registration server 212 and the registration server 212 is configured to send a signed certificate bound to the requesting device to the security application 206.

In many embodiments, the security application is separate from the media player. In such embodiments, a communication channel is provided between the media player and the security application. In certain embodiments, this communication channel is secured using SSL, using the HTTPS protocol, or a proprietary secure authenticated channel. (SAC). In other embodiments, the security application is embedded within the media player (e.g., as a security library). Such integrated embodiments eliminate the need for an open communication channel.

Content servers stream content and send playlist data to a user device. Playlist data contains links to the content required for playback. There may be single or multiple content servers, depending on the content request. For example, content can reside across several servers or can all be included on one server. Likewise, there can be a single security server, or a plurality of security servers. Security access data, such as keys or tokens can reside across several security servers or all be included on one server. The media player allows for playback of content as media, such as video media. The security application manages the request for content from the content server, allowing the media player to obtain content directly from the server, while providing security keys to the media player as needed to allow decryption of content. The security application monitors requests for security access data from the media player, and obtains the necessary security access data from the security server. In one embodiment, the security application pre-fetches security access data from the security server in anticipation of an upcoming demand for security access data from the media player. This is done, for instance, to speed up key fetches key change boundaries or to spread a large number of key requests at the same time caused by a large number of devices tuned to the same "live" channel.

In several embodiments, a content request includes a request for specific streaming content to the media player. Content is streaming content to the media player, such as videos or movies. Content access data includes playlist data or information on available media that can be played by the media player as well as security access data including requisite keys or tokens for playback of encrypted or secure content. A content access request includes a request for playlist data or for security access data, including keys and tokens. Playlist data includes playlists or information for accessing content for media player consumption. In one embodiment, playlist data includes a plurality of Uniform Resource Identifiers (URI) or Uniform Resource Locators (URL) that represent specific portions of available content, as well as URIs representing security access data. In several embodiments, pointers, data addresses, logical addresses or any metadata indicating a location of data is used in place of a URI. The security application evaluates the playlist data, and sends URIs to the media player to allow the player to obtain content directly, while modifying all URIs relating to security access requests, thus routing all requests for security access data through the security application. Specifically, the security application looks like the security server to the media player while the security communicates to the actual security server. Therefore, the security application may employ the most suitable authentication and key management protocol for this purpose. This may be a protocol similar to that used by Internet Protocol. TV (IPTV) systems or an TLS/SSL-based protocol with specific key request messages protected by the TLS/SSL session key or even a $3^{rd}$ party or standard DRM protocol such as Marlin. Registration information from the security application allows a registration server to verify that a user or device is registered and entitled to access content. Registration confirmation, such as a signed security certificate, gives the device permission to request access to content. For example, in one embodiment, a registration server verifies if a user or user device is a paying subscriber to streaming content. A security server can confirm that permission to access content with the registration server. For instance, by validating that the request is signed and accompanied by a signed certificate properly issued and signed by the registration server. These certificates may be using the standard X.509 certificate format. Alternatively, the registration server will register the unique device ID with the middleware (subscriber management system, billing system, etc.) where it can be checked by the security server to validate proper provisioning. A security access request includes a requess for a key or token for access to protected content. Likewise, security access includes keys or tokens for access to protected content.

In the illustrated embodiment, the security application 206 registers the user and user device 202 with the registration server 212. Then the security application 206 receives a signed certificate from the registration server 212. This process is known as provisioning, and is described in more detail in FIG. 4. The security application 206 then receives a request for playlist data from the media player 204. The security application 206 requests and retrieves a playlist data from the content server 208. The security application then parses the playlist data, replacing all playlist data including key file URIs with modified URIs with local host and port information for the security application. The URIs for the actual content are not changed. The security application also retains the original. URIs for later use. The security application then sends the playlist data, with the modified URIs, to the media player 204. The media player 204 then requests and receives streaming content from the content server 208. There may be situations where the streaming content requires security access, including a key for encrypted streamed content or a login token to access content. Because of the modified URIs, these requests are directed to the security application. In those situations, the security application requests and receives the relevant security access from the security server using the signed certificate. In one embodiment, the security server 210 confirms the registrations with the registration server 212 before sending the security access data to the security application 206. The security application 206 then sends the security access data to the media player 204 to playback the secured content. The security access request includes the content ID or key ID as well as other information about the device such as device type, operating system version number, player version number, security version number, device status, device security status (e.g., jail-broken vs. non jail-broken or rooted vs. non rooted or otherwise illegally tampered with) in certain embodiments. Similarly, the security access data response may include the content decryption key, content access or usage rules, output control information and other controls/restrictions in certain embodiments. The security access data includes a content decryption key for the next crypto period if the encryption keys change throughout the duration of the content in various embodiments. For example, the key validity start and end time may be included as well as a suggested time to request the next key.

Streaming Content Process Overview

Figure 3:
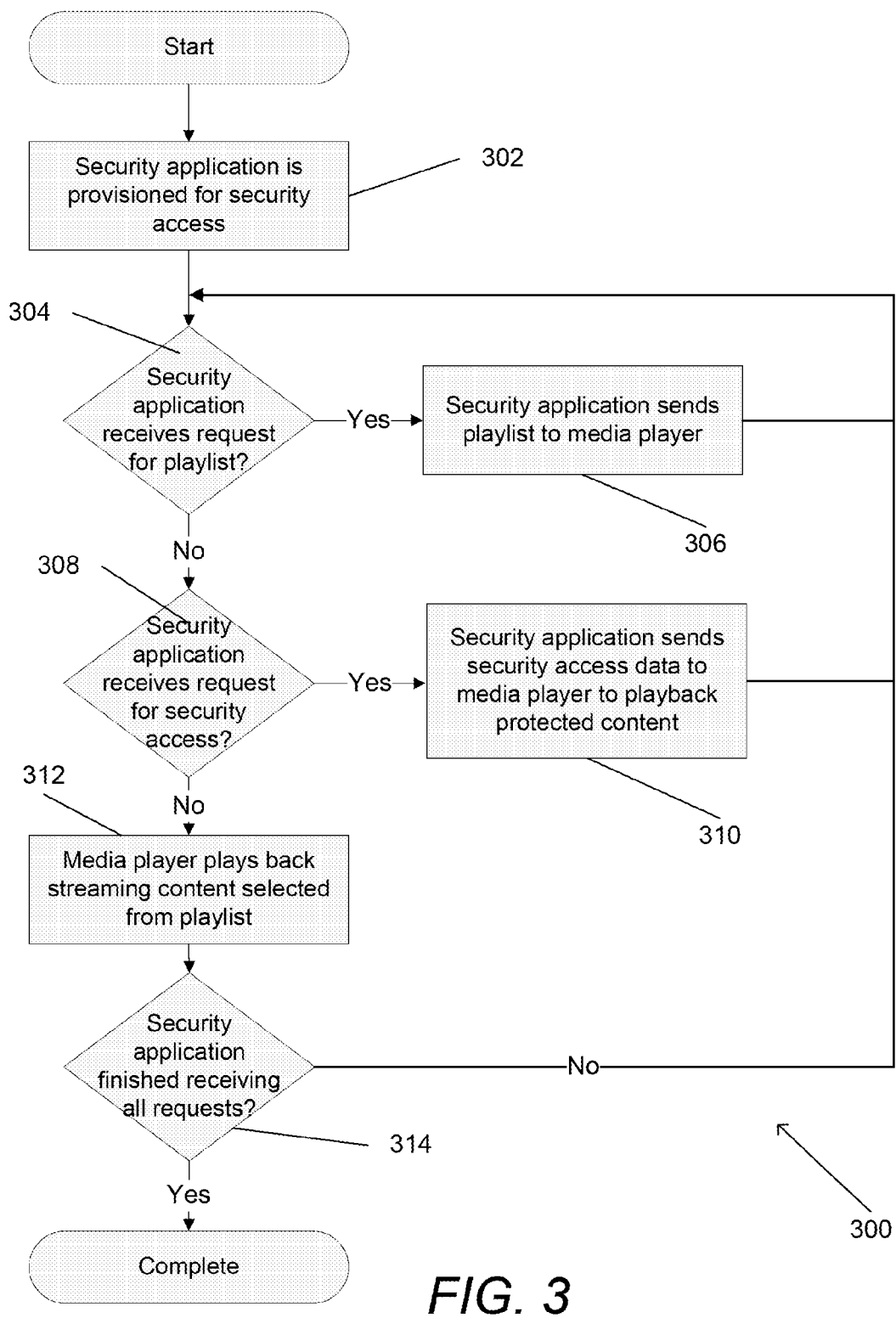
FIG. 3 is a flow chart illustrating an overview of streaming content with a security solution in accordance with an embodiment of the invention.

FIG. 3 is a flow chart illustrating an overview process 300 of receiving streaming content on a device with a security solution in accordance with an embodiment of the invention. The process 300 begins with provisioning (302) a security application for security access. The provisioning process in described in more detail below in connection with FIG. 4. After provisioning (302), a decision (304) is made as to whether the security application is receiving a request for a playlist. If a playlist request is made, the security application connects with the content server to obtain the playlist data, parses the playlist data file as described above, and sends (306) playlist data with modified URIs to the media player and the process loops back to determine whether there is a playlist request. The process of sending playlist data to a media player in described in more detail below in connection with FIG. 5. If a playlist request is not made, then a decision (308) is made as to whether the security application is receiving a request for security access. If a request for security access is being made, then the security application contacts the security server and requests the security access data. The security application was previously authenticated during provisioning, and has already obtained security credentials such as a signed security certificate. Based on the authentication of the security application that occurred during provisioning and based on entitlements associated with this device, the security application then receives the security access data, and sends (310) security access data to the media player to enable playback of protected content. The process for sending security access data to the media player is described in more detail below in connection with FIG. 7. The process then loops back to whether (304) there is a playlist request. If the security application is not receiving a request for security access, then the security application waits for the next playlist request or key file request. The media player continues to play back (312) the streaming content previously selected for playback, requesting additional key files or playlist data from the security application as necessary; for instance, if keys are changed periodically or playlist data is modified/amended especially for "live" content. The process for playing back content is described in more detail below in connection with FIG. 6. After playback (312) of content (complete or partial), a decision (314) is made as to whether the security application has finished receiving all requests. If the security application has not finished receiving all requests, the process loops back to determining whether (304) the security application is receiving a request for a playlist. If the security application has finished receiving all requests, the process ends.

In numerous embodiments, the process loops until the security application finishes receiving all requests. For example, content from a playlist may finish playback and the user has finished requesting playlists. In certain embodiments, a security application receives a request for a playlist before the security application receives a request for security access data. The security application parses playlist data, which allows for security application to determine the keys necessary for playback of content.

In many embodiments, the security application provisions the device by registering the device and user with a registration server. The registration server verifies the registration, allowing the device access to content. The security application then secures the signed certificate from the registration server.

In various embodiments, the security application sends playlist data to the media player upon a request for the playlist. The request can come from the media player or otherwise from the user. For example, the playlist request can come from accessing a Uniform Resource Identifier (URI), Uniform Resource Locator (URL), pointer, data address or logical address. The security application requests and receives the playlist data from a content server and sends the playlist data (which includes modified URIs for security access) to a media player.

In several embodiments, the media player plays back streaming content selected from the playlist data by requesting and receiving specific streaming content from the content server.

In a multitude of embodiments, the security application sends security access data to the media player, including keys for encrypted content or login tokens for access to protected content. Keys or login tokens can be received by the media player from the security application before, during or after playback of streaming media begins.

Provisioning for Playback of Streaming Content

Figure 4:
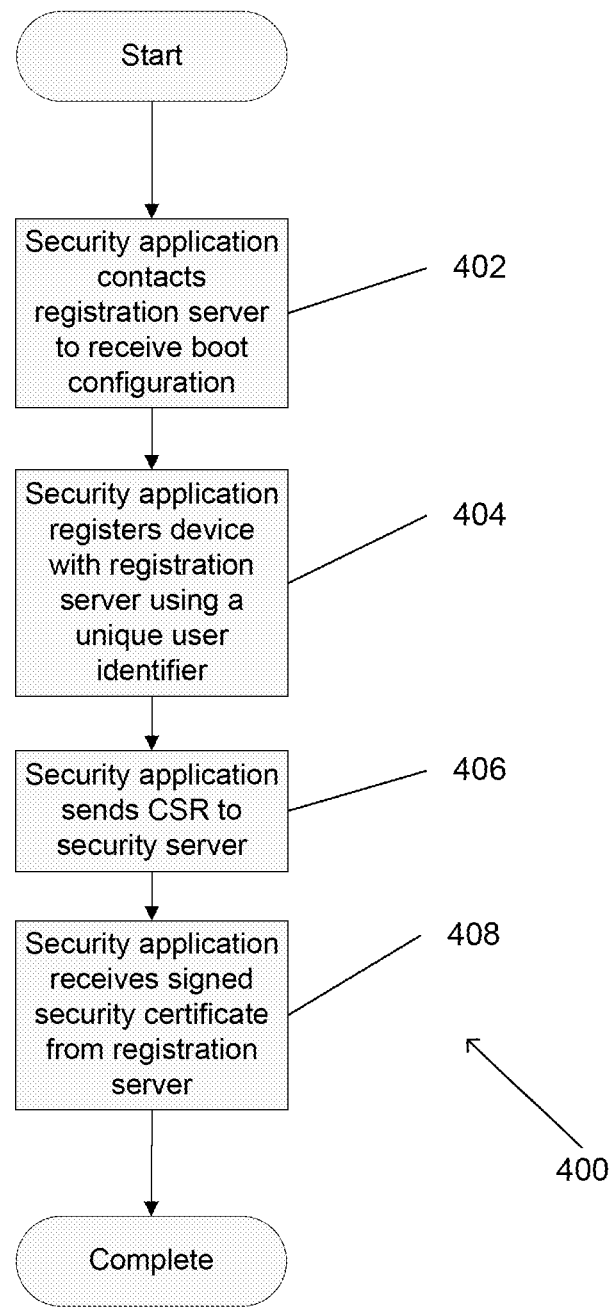
FIG. 4 is a flow chart illustrating a process for provisioning a device for playback of streaming content in accordance with an embodiment of the invention.

FIG. 4 is a flow chart illustrating a process 400 for provisioning a device for playback of streaming content in accordance with an embodiment of the invention. The process 400 begins with a security application contacting (402) the registration server to receive the boot configuration. After receiving the boot configuration, the security application registers (404) the device with the registration server using a unique user identifier. In one embodiment, the security application presents a user with a unique identifier. Then the security application registers the device with the operator on the registration server, using the unique identifier. After registering (404) the device, the security application sends (406) a Certificate Signing Request (CSR) to the registration server. After sending (406) the CSR, the security application then receives (408) the signed security certificate from the registration server. The above transactions are typically performed in a secure manner, such as using TLS/SSL protected communication (HTTPS protocol).

In one embodiment, the security application on the device already has the boot host and port information in order to connect with the registration server for the boot configuration. After the registration server receives a CSR from the security application, the registration server will check for entitlements and then sign, encrypt and return the signed certificate to the security application. In another embodiment, the user may enter a unique identifier that is provided by the operator. Both of these procedures establish a logical connection between a particular subscriber and a particular device. In other embodiments, various methods are used to establish a logic connection between a given subscriber and device in other ways as well, which are discernable by one skilled in the art.

In one embodiment, the retrieval of a signed certificate in response to a CSR begins with the security application generating a public-private key pair and a unique identifier. The security application sends the identifier and the public key to the registration server to get the identifier certified and gets a X.509 certificate as a response. This is later used to establish an SSL/TLS session which is then used to protect the client server communication/messages.

In one embodiment, the unique identifier may be transmitted to the device using a protocol or channel other than the customary http or https communication. In one embodiment, Short Messaging Service (SMS) is used to transmit the unique identifier such as a login token. This provides a benefit in providing authentication via a different network (the cellphone network), and the communication path is bound to a device and registered to a billing record. It will be appreciated that in other embodiments, the token is displayed by obfuscation methods that do not allow for automated readout, such as by a Turing test or captcha images that verify that the authentication process cannot be automated but that human interaction is required.

In other embodiments, provisioning the device is accomplished by other methods of verifying and modifying the device to be durably bound to a subscriber account. This is accomplished by blocking and verifying the request required to access the decrypted content. Modification for registration or provisioning may include the loading or storing and generation of certificates and pseudo random numbers used in registration or authentication. The confidentiality of keys and certificates stored are an important part of the security solution and it is therefore important that they are protected. Protection of the client application can be realized with techniques like obfuscation, anti-debugging, key smearing and others techniques that one skilled in the art can ascertain.

In another embodiment, the device contacts and registers with the registration server to obtain a signed certificate associated with the entire device and not just the security application. In certain embodiments, each signed certificate corresponds to registration with a certain operator. However, in other embodiments, a single signed certificate can indicate registration with multiple operators. In particular embodiments, multiple signed certificates are obtained, and the security application is provisioned to multiple registration servers representing different services or operators. However, in another embodiment, provisioning occurs only once to a central registration server to obtain a single unique identity and signed certificate which is used to communicate with several different operator-specific security servers.

Security Application Sending Playlist Data to a Media Player

Figure 5:
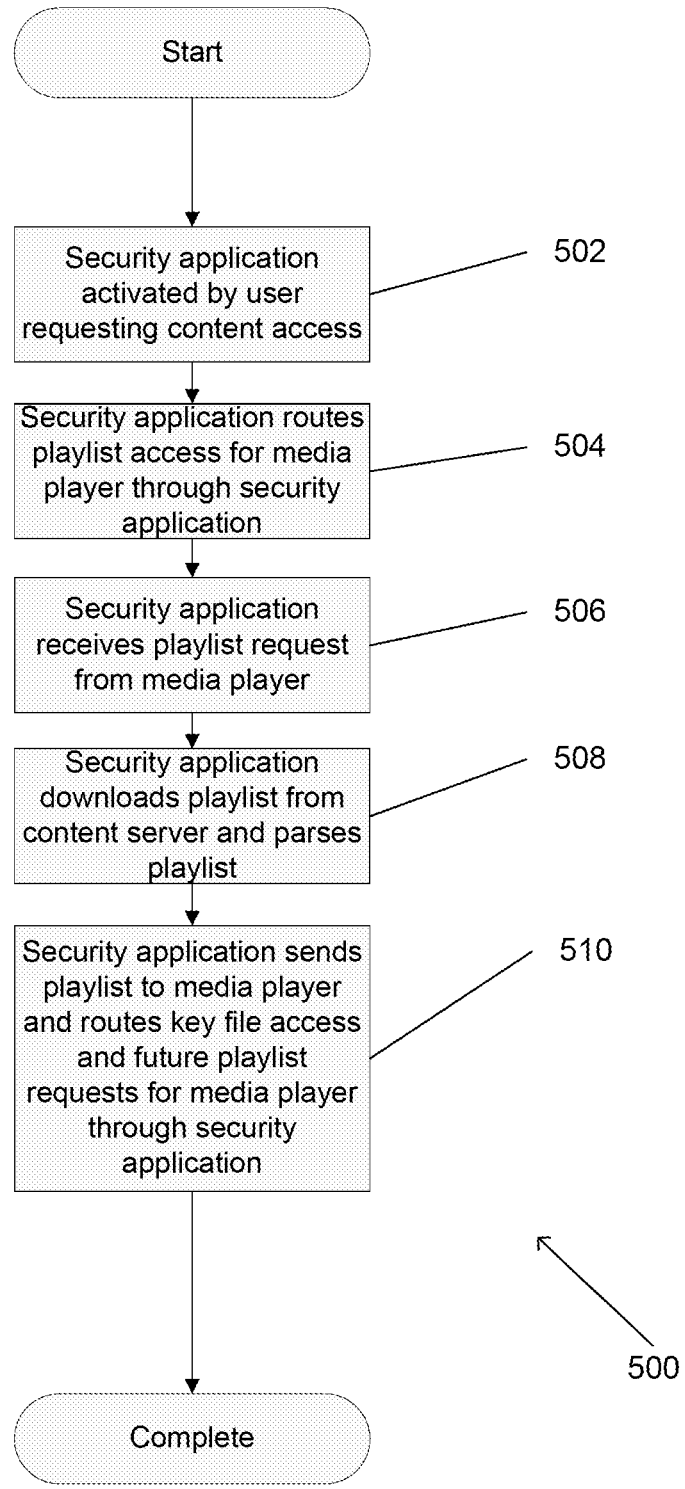
FIG. 5 is a flow chart illustrating a process for a security application sending playlist data to a media player in accordance with an embodiment of the invention.

FIG. 5 is a flow chart illustrating the process 500 for the security application sending playlist data to a media player in accordance with an embodiment of the invention. The process 500 begins by activating (502) the security application through a user requesting content access. In one embodiment, the security application is activated when content is requested through a media player. In another embodiment, the security application is activated when it receives a URI. After security application activation (502), the security application monitors (504) playlist requests from the media player. When the security application receives (506) a playlist request from the media player, the security application obtains (508) the playlist data from the content server and parses (508) the playlist data. In one embodiment, parsing the playlist data includes replacing all URIs in the playlist data file related to playlist and key file requests with modified URIs having the local host and port of the security application, while saving the original. URIs. After downloading (508) and parsing (508) the playlist data, the security application sends (510) the playlist data with the modified URIs to the media player and thereby routes key file access and future playlist access for the media player through the security application.

In many embodiments, the user requests content access by manually entering the HTTP Live Streaming URL into the security application or clicking on a HTTP Live Streaming URL. The security application is data activated for playlist data processing where the URL specifies a protocol that is associated with the security application or the playlist data is of a Multipurpose Internet Mail. Extensions (MIME) type that is associated with the security application. For example, the protocol could begin with "httpv://" to show that this is a security application.

In several embodiments, the security application routes playlist data access by replacing the host and port portion of the URI with the local host and local port of the HTTP server that the security application is running. The routing can also be performed by any process that causes the media player to seek playlist data or security access from the security application. Depending on the player capabilities and security requirements, the connection between the player and the security may be secured using Transport Layer Security (TLS) or Secure Sockets Layer (SSL), for example indicated by the HTTPS protocol. Depending on its use the URIs are converted to enable or disable the protocol types. In another embodiment, the security application and the media player may use another standard or proprietary authentication mechanism. In another embodiment, the security application is embedded within the media player, and thus no such connection is required. In many embodiments, the modified URI is given to the media player. In one embodiment, the original server host and port are recorded by the security application for when it retrieves the playlist data from the server. Alternatively, in another embodiment, the URI that is passed to the player application will contain the original destination as parameters that can be used on request. For example, the original values may also be sent as encoded parameters in the modified links to be directly available when presented at the media player.

In one embodiment, the security application receives a playlist request from the media player as the media player sends requests for playlists or security access to the security application. For example, the media player sends data based on the modified host and port values that point to the security application.

In several embodiments, the security application downloads the playlist data from the content server and parses the playlist data after receiving a playlist request. The security application stores information associated with the original playlist access such that the security application can request and download the playlist data directly.

In one embodiment, the security application sends the playlist data to the media player and routes future playlist and security access requests through the security application by any process that causes the media player to seek playlist data or security access from the security application. For example, in one embodiment, the security application replaces the host and port in all URIs for key files and playlists with local values associated with the security application. The security application stores the original values for requesting and downloading playlists or security access for use when the security application receives a request for a playlist or security access. In another embodiment, the original. URI values are sent to the media player as encoded parameters in the modified links to be directly available when presented at the media player.

In a multitude of embodiments, the URIs for the media files do not require modification, which allows the media player to request and retrieve content directly from the content server. Thereby, all playlists and key file retrievals are intercepted by the security application, while all content is directly downloaded by the media player.

Media Player Playing Back Streaming Playlist Content

Figure 6:
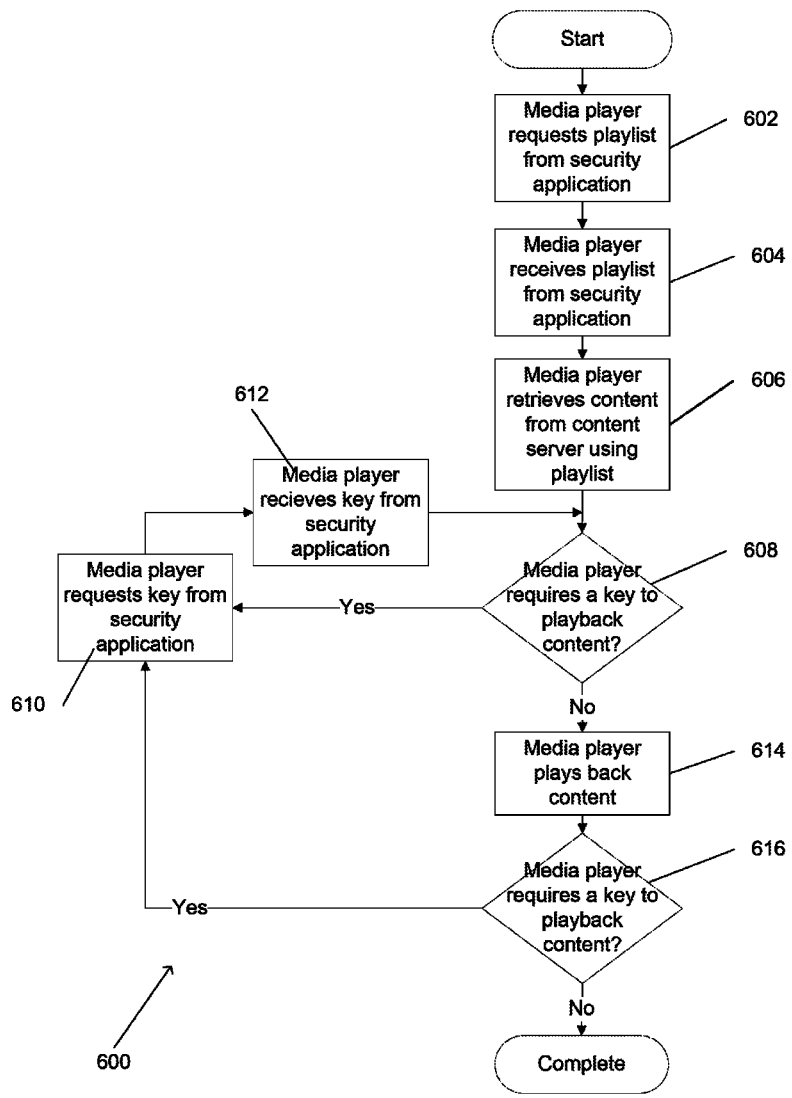
FIG. 6 is a flow chart illustrating a process for the media player to play back streaming content selected from a playlist in accordance with an embodiment of the invention.

FIG. 6 is a flow chart illustrating a process 600 for a media player playing back streaming content selected from playlist data in accordance with an embodiment of the invention. The process 600 begins with the media player requesting (602) a playlist from a security application. The media player requests a playlist from a security application due to the security application routing playlist data access for the media player through the security application in certain embodiments. After requesting (602) a playlist, the media player receives (604) the playlist data from the security application. After receiving (604) the playlist data, the media player retrieves (606) content from a content server using the playlist data. After retrieving (606) content, the media player makes a decision (608) as to whether it requires a key to playback content. A key is required before playing content in certain embodiments, for example if all of the requested content requires a key. In particular embodiments, the initial content for playback requires a key, such as where a key is required to playback the first few minutes of a movie and therefore a key is required at the beginning of playback. If the media player requires a key, the media player requests (610) the key from the security application. After requesting (610) the key, the media player receives (612) the key from the security application. After receiving the key, the process loops back to the decision (608) for whether the media player requires a key to playback content. In certain embodiments, multiple keys are required to playback content. In particular embodiments, only a single key is required to playback content. If the media player does not require a key to playback content or if it already received the key, then the media player plays back (614) the content. After playing back (614) the content, a decision (616) is made as to whether the media player requires a key to playback additional content. If the media player requires a key to playback additional content, then the process loops to the media player requesting (610) a key from the security application. Only part of content for playback requires a key in certain embodiments, for example where a later part of a movie file for playback requires a key. One embodiment also requires a key only in certain parts of content or even different keys in different parts of content for playback. If the media player does not require a key, then the process is complete. In another embodiment, different bitrates of the same content may be encrypted with different keys. In that case, when the player switches between different bitrates of the content, it may need to request a new key as well.

In many embodiments, the media player retrieves content directly from content server using the modified URIs. However, the media player will request and retrieve security access and playlist data from the security application. In this way, content can be played back by the media player but any security issues such as key for decryption of encrypted content and tokens for access to content is handled by the security application.

In several embodiments, when playlist data is accessed, additional authentication from the user or device may be requested to access high value content. High value content includes content that is restricted based upon age or geographic location. For example, certain types of content may be rated only for mature audiences or subject to a geographic distribution limitation. In one embodiment, a login token may be requested to access content before streaming the content. In certain embodiments, this includes providing PIN or password for content accessible only for users of a certain class, including age, time of access, or location. For example, age ratings require certain restrictions for certain rating levels. Rating can be handled by the security application if rating levels and restrictions are provided by the security server in the key response. Also, the player may provide rating metadata to the security application which may require the user to enter a PIN or password before requesting the key from the security server. Authentication can also restrict content distribution rights to specific countries or to enforce sports blackouts. It may also be used to differentiate between content being accessed from the home where content is limited to home consumption and may not be available outside of the home. In one embodiment, this is accomplished by ensuring that the portable device using WiFi has the same IP address as other devices connected to the same service, such as IPTV service.

In a number of embodiments, the bitstream properties are matched to the capabilities of the playback device and player. Bitstream properties are factors that affect bitstream content and performance, including bandwidth, program ID, codecs, and pixel resolution. The bitstream properties may be preconfigured, determined from the playlist URIs or read from the playlist data. For example, improved adaptation can come from the selection of a resolution that best suits the playback device. The improved adaptation can occur by filtering the playlist data when it is transcribed for the player and eliminating unsuited or adding better suited links or converting the links during access. This can apply not only for the keys but also for the content accessed by the player.

Security Access

Figure 7:
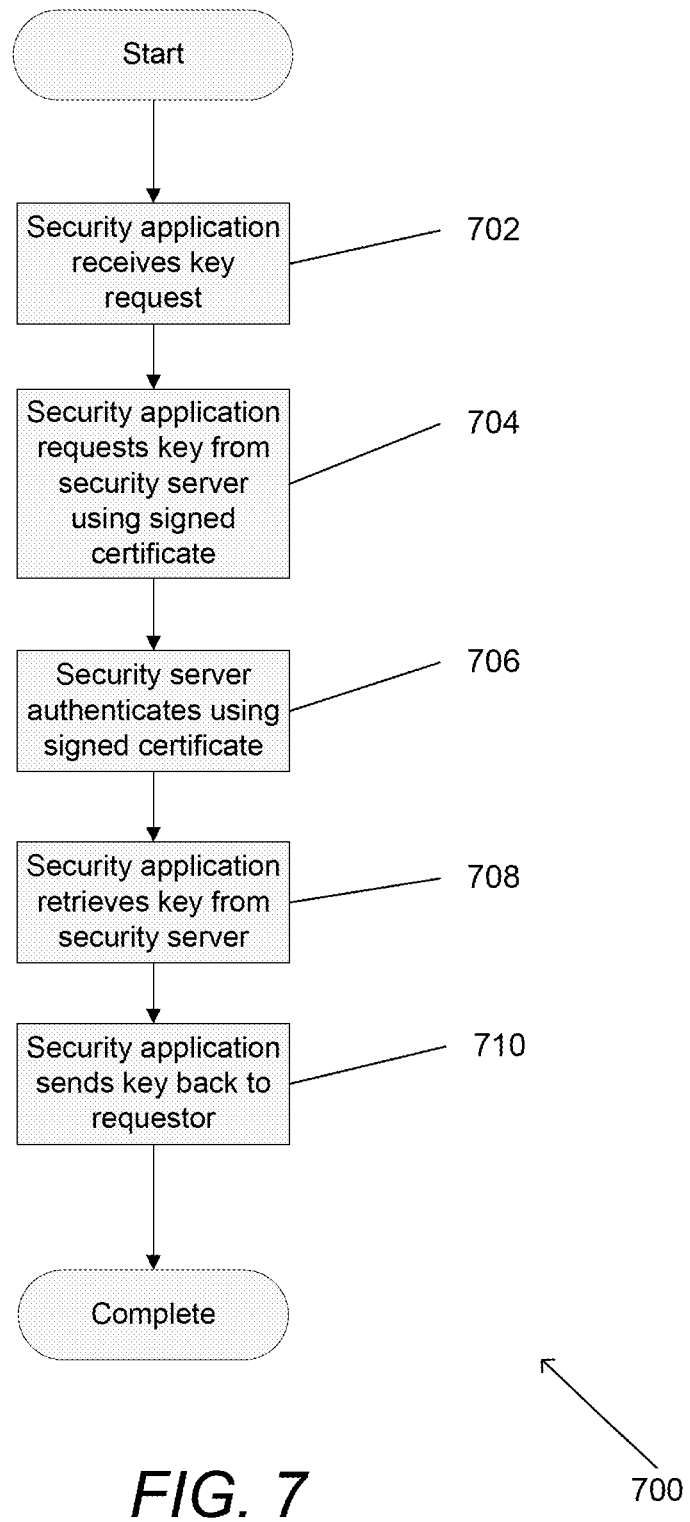
FIG. 7 is a flow chart illustrating a process for the security application sending security access to a media player to playback protected content in accordance with an embodiment of the invention.

FIG. 7 is a flow chart illustrating a process 700 for a security application sending security access data to a media player to playback protected content in accordance with an embodiment of the invention. In the illustrated embodiment, the process 700 begins when the security application receives (702) a key request from the media player. After receiving (702) a key request, the security application requests (704) the key from a security server using the signed certificate that it obtained during provisioning. After requesting (704) the key, a security server authenticates (706) the signed certificate. After authenticating (706) the signed certificate, the security application retrieves (708) the key from the security server. After retrieving (708) the key, the security application sends (710) the key back to the media player. Optionally, the authentication step (706) may also include an entitlement check. Specifically, the security server uses the entitlement database to check whether the user or device specified in the key request has been authorized to access the content associated with the specific key request. This information is typically provided by a Subscriber Management System (SMS) or a Billing System or a Content Portal where the user explicitly purchases a specific piece of content.

In many embodiments, the security application receives the key file request from the media player. For example, when a key file is requested by the media player, the request will go through the security application since the key file URI was modified by the security application. The security application routes security access from the media player thorough itself.

In several embodiments, the security application requests the key directly from the security server using the signed certificate received during provisioning. Also, the security application stores the original values pointing to the actual location where keys could be found. The security application then uses these original values to find and retrieve the appropriate key. The original values can be taken from the original playlist data or URI that is associated with the content for which the key is sought. Alternatively, the security application may be preconfigured (e.g. during provisioning) to always request keys from a specific security server.

In numerous embodiments, the security server authenticates using the signed certificate received during provisioning. In one embodiment, this occurs over a mutually authenticated session with the security server.

In various embodiments, the security application retrieves the key from the security server after authentication. In one embodiment, the retrieval occurs over a mutually authenticated session with the security server.

In one embodiment, the security application sends the key back to the requestor, which is the media player.

In a number of embodiments, the security access data is not necessarily a key but can be a login token or a password or any other method of accessing protected data.

In various embodiments, playlist data may be initially issued and then converted to request different authorization and cost levels, for example depending on the quality level that is accessed. This is secured with the use of different keys for different sections of the content, such as alternative content with ads, or different quality levels. For example, some keys may be available for free, while others may be available for certain users that have a given subscription status. Yet other keys may be made available only after explicit user interaction such as a purchase confirmation. Additional usage scenarios are possible as well, such as user request to use the best bit rate that is still free.

In numerous embodiments, different bitrate streams are encrypted by different keys. This way only subscribers paying for the high quality or HD service will get the keys for the HD bitrate while other customers get only keys to decrypt Standard Definition (SD) content, for example. Similarly, only devices that have not been jail-broken, have proper output controls or hardware based security may get keys for HD bitrates while less trusted devices will get only keys for SD content.

In multiple embodiments, the security solution can be utilized to address sudden, overwhelming demands for keys from the security server. This is applicable across many applications, including on-demand streaming and live content streaming as well simulating traditional broadcast television. When a large number of devices are watching the same stream, all devices typically request the new key each time the content decryption key changes, generating a spike in key request and causing scalability challenges for the key server. In order to address this problem, in one embodiment the key request/response exchange between the security application and the security server delivers not only the current decryption key but also the next decryption key. This way, when the keys change, the security application does not have to request the new key right away as it already has the next key. Additionally, the response message may indicate when the security should request the next key. This mechanism may be used to scatter the individual key requests evenly throughout the key period.

Particular embodiments include security applications that send information to the security server, including device, user or network access information. This may include the Internet Protocol. (IP) address or the type and version of the device or the condition or status of the device (such as the security status of the device, for example if the device has been jail-broken, rooted or otherwise illegally tampered with). All this information may be used by the security server to implement additional content distribution or access policies. For example, premium content may be available only while the device is at home. High Definition (HD) content may be available only to certain devices with specific level of hardware security or to those that have not been jail-broken or rooted. Also, premium HD content may be available only to devices that can control their outputs, including turning on High Bandwidth Digital. Content Protection (HDCP) on a High Definition Multimedia Interface (HDMI) output or turn off analog output. These output controls are communicated by the security server's key response message, which can be similar to Internet Protocol. Television (IPTV) Entitlement Control. Message (ECM) or Entitlement Management Message (EMM) messages.

In many embodiments, the security application may collect information about the player including content type (e.g. genre), what time of day content is accessed, how long the content is accessed for. All of this information may be provided to the server for additional services, including assisting in content recommendations or targeted ad selection. For example, this information can be utilized for audience measurements or subscriber intelligence that can be used within one distribution network such as OTT over HLS or across networks to gather more useful information about the user regardless which device or what location she may be using. This information may be combined by the server with similar information collected from other devices, such as IPTV. The information may be used to identify what content is more suitable for watching in the living room on a large screen TV versus on a personal, portable device such as a tablet. The information may also be used to cross-reference content, such as notifying the user that she has not completed watching a program on one device and that the program is now available on the portable device. These processes are applicable to many protocols, including HLS, Smooth Streaming, MPEG-DASH, and other download, streaming and adaptive bit-rate protocols.

Variations include the embedding of advertisement for some users which could be targeted to their viewing behavior observed on the player, time of day observed on the playback device, location observed on the playback device or from the IP address, subscriber level or billing records observed on the head-end. Advertisement may be dynamically selected or enabled depending on viewer's choice to select ad supported and cost reduced content.

Closing

Although the present invention has been described in certain specific aspects, many additional modifications and variations would be apparent to those skilled in the art. It is therefore to be understood that the present invention may be practiced otherwise than specifically described, including various changes in the implementation. Thus, embodiments of the present invention should be considered in all respects as illustrative and not restrictive.

What is claimed is:

1. A system for receiving secure content over a network, comprising:
    a user device in network communication with a remote content server and a remote security server, comprising:
        a media player;
        a security application;
        wherein the security application is configured to:
            receive a request for playlist data from the media player;
            send a playlist request to the remote content server based upon the received request for playlist data from the media player;
            receive playlist data from the remote content server, wherein the playlist data includes at least one uniform resource identifier ("URI") regarding portions of available content for playback and at least one URI regarding security access data;
            evaluate the playlist data and modify the at least one URI related to security access data, where the modified URI routes requests for security access data from the media player through the security application;
            send at least a portion of the received playlist data that includes at least one modified URI regarding security access data to the media player;
            receive a security access request from the media player based upon the at least one modified URI regarding security access data;
            send a security access request to the remote security server based upon the received security access request from the media player, wherein the security access request comprises a request for a key required to decrypt encrypted content;
            receive security access data from the remote security server; and
            send at least a portion of the received security access data to the media player.

2. The system of claim 1, wherein the security application is configured to:
    send registration information to a remote registration server; and
    receive a signed security certificate from the remote registration server.

3. The system of claim 1, wherein the media player is configured to send a content request to a remote content server using the playlist data and receive content from the remote content server for playback on the media player.

4. The system of claim 2, wherein the security application is embedded in the media player.

5. The system of claim 1, wherein the media player and the security application communicate securely with each other.

6. The system of claim 1, wherein the security application is further configured to:
    obtain device data from the user device associated with the security application;
    send at least a portion of the device data to the remote security server; and
    receive security access data associated with the device data from the remote security server;
    wherein the security access data allows access to secured content based on the device data.

7. The system of claim 6, wherein the device data comprises the age of a user of the security application.

8. The system of claim 6, wherein the device data comprises the geographic location of the user device.

9. The system of claim 6, wherein the device data comprises a predetermined function of the user device.

10. The system of claim 6, wherein the device data comprises a determination of the security status of the device.

11. The system of claim 6, wherein the device data comprises a determination of the device's output capabilities.

12. The system of claim 3, wherein:
    the content request comprises a request for an advertisement; and
    the content comprises the advertisement for playback on the media player.

13. The system of claim 1, wherein the security application is further configured to:
    obtain device data from a user device associated with the security application;
    send at least a portion of the device data to the remote security server;
    receive playlist data comprising targeted advertisements based upon the device data; and
    send the playlist data to the media player.

14. The system of claim 2, wherein the registration information comprises a unique user identifier.

15. The system of claim 14, wherein the unique user identifier is received on the user device.

16. The system of claim 1, wherein the security application is configured to parse the playlist data and replace all Uniform Resource Identifiers in the playlist data related to the playlist request and the security access request with modified Uniform Resource Identifiers directing the playlist request and the security access request from the media player to the security application.

17. The system of claim 1, wherein the security application is configured to determine a security status of the device and send playlist data to the media player in accordance with the security status of the device.

18. The system of claim 1, wherein the playlist data includes content accessible by different bitrate streams that are encrypted by different keys.

19. The system of claim 1, wherein the playlist data includes different authorizations, with associated cost levels, that require different keys from the remote security server for the different authorizations.

20. The system of claim 1, wherein the security access data comprises multiple keys for decrypting different parts of content sent from the remote security server to the security application simultaneously.

21. The system of claim 1, wherein the security application obtains a key in the security access data before such key is requested in a content access request and caches the key until the key is requested in a content access request.

22. The system of claim 1, wherein the security access data comprises a key and at least one output control.

23. A method of receiving secure content over a network using a security application configured to operate on a user device with access to the network, the method comprising:

receiving, by the security application, a request for playlist data from a media player;

sending, by the security application, a playlist request to a remote content server based upon the received request for playlist data from the media player;

receiving, by the security application, playlist data from the remote content server, wherein the playlist data includes at least one uniform resource identifier ("URI") regarding portions of available content for playback and at least one URI regarding security access data;

evaluating the playlist data and modifying, by the security application, the at least one URI related to security access data, where the modified URI routes requests for security access data from the media player through the security application;

sending, by the security application, at least a portion of the received playlist data that includes at least one modified URI regarding security access data to the media player;

receiving, by the security application, a security access request from the media player based upon the at least one modified URI regarding security access data;

sending, by the security application, a security access request to a remote security server based upon the received security access request from the media player, wherein the security access request comprises a request for a key required to decrypt encrypted content;

receiving, by the security application, security access data from the remote security server; and sending, by the security application, at least a portion of the received security access data to the media player, wherein the portion of the received security access data is utilized by the media player to playback the portions of available content.

24. The method of claim 23, wherein the method further comprises:

sending registration information to a remote registration server; and receiving a signed security certificate from the remote registration server.

25. A system for receiving secure content over an unmanaged network, comprising:

a user device with access to the unmanaged network, comprising:

a media player;

a security application wherein the security application is configured to:

send registration information to a remote registration server, wherein the registration information comprises a unique user identifier received on the user device;

receive a signed security certificate from the remote registration server;

receive a request for playlist data from the media player;

send a playlist request to a remote content server based upon the received request for playlist data from the media player;

receive playlist data from the remote content server, wherein the playlist data includes at least one uniform resource identifier ("URI") regarding portions of available content for playback and at least one URI regarding security access data;

evaluate the playlist data and modify the at least one URI related to security access data, where the modified URI routes requests for security access data from the media player through the security application;

send at least a portion of the received playlist data that includes at least one modified URI regarding security access data to the media player;

receive a security access request from the media player based upon the at least one modified URI regarding security access data;

send a security access request to a remote security server based upon the received security access request from the media player, wherein the security access request comprises a request for a key required to decrypt encrypted content;

receive security access data from the remote security server; and send at least a portion of the received security access data to the media player.

* * * * *